Feb. 15, 1966  J. R. LEONARDS  3,234,796
SAMPLE SUPPLY APPARATUS AND METHOD
Filed April 10, 1963  7 Sheets-Sheet 1

INVENTOR.
JACK R. LEONARDS
BY Bosworth, Sessions,
Herrstrom & Knowles
ATTORNEYS.

Feb. 15, 1966 J. R. LEONARDS 3,234,796
SAMPLE SUPPLY APPARATUS AND METHOD
Filed April 10, 1963 7 Sheets-Sheet 2

Fig. 2

INVENTOR.
JACK R. LEONARDS
BY Bosworth, Sessions,
Herrstrom & Knowles
ATTORNEYS

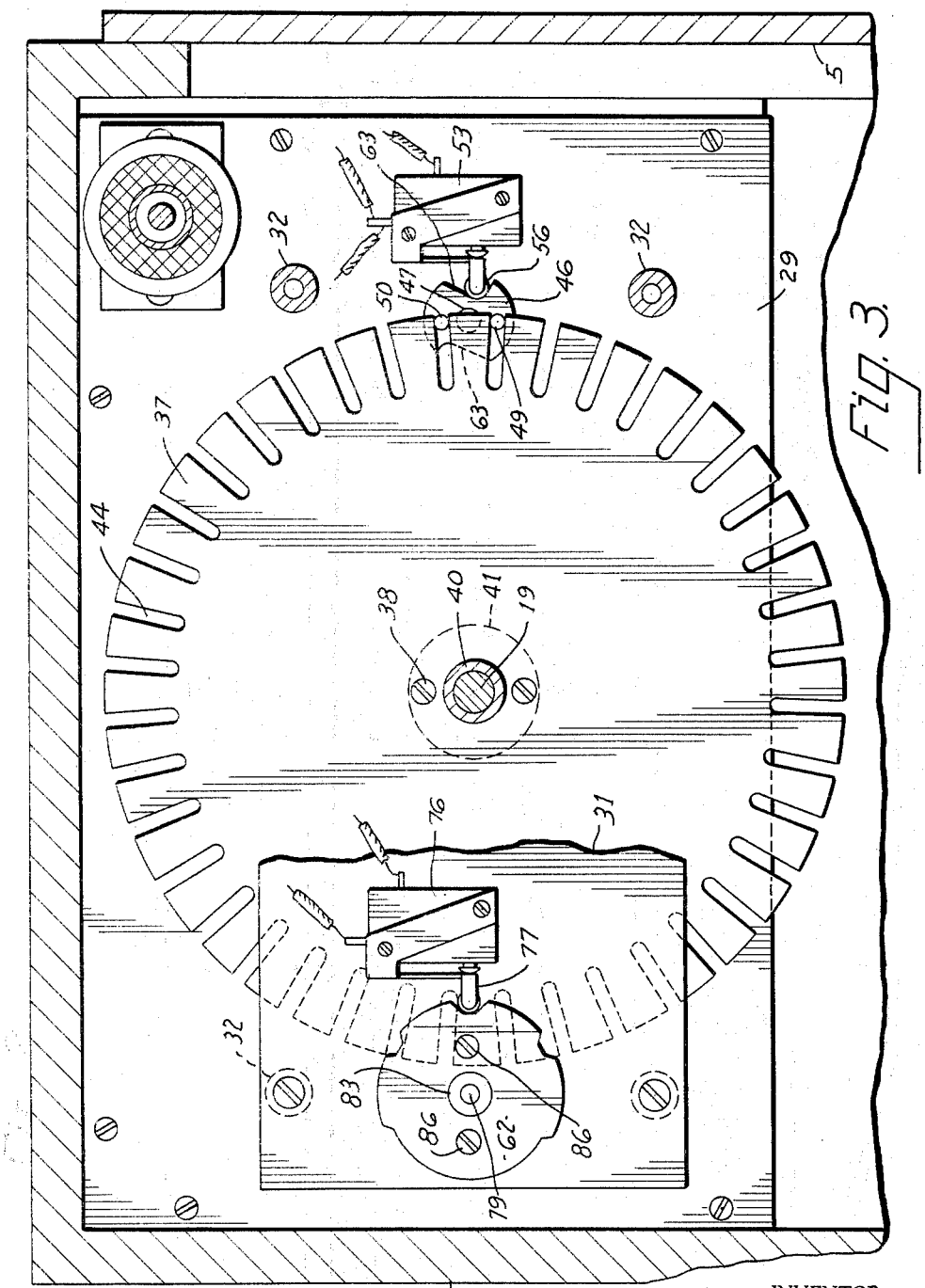

Feb. 15, 1966 J. R. LEONARDS 3,234,796
SAMPLE SUPPLY APPARATUS AND METHOD
Filed April 10, 1963 7 Sheets-Sheet 4

INVENTOR.
JACK R. LEONARDS
BY Bosworth, Sessions,
Herrstrom & Knowles
ATTORNEYS.

Feb. 15, 1966   J. R. LEONARDS   3,234,796
SAMPLE SUPPLY APPARATUS AND METHOD
Filed April 10, 1963   7 Sheets-Sheet 5

INVENTOR.
JACK R. LEONARDS
BY Bosworth, Sessions,
Herrstrom & Knowles
ATTORNEYS

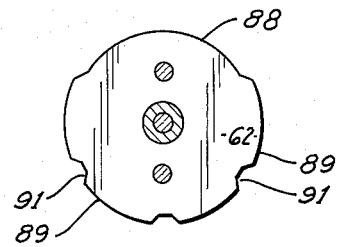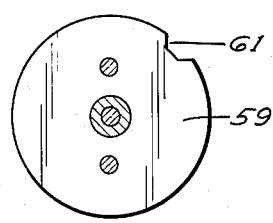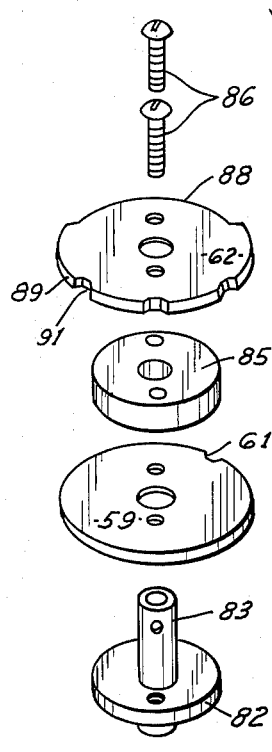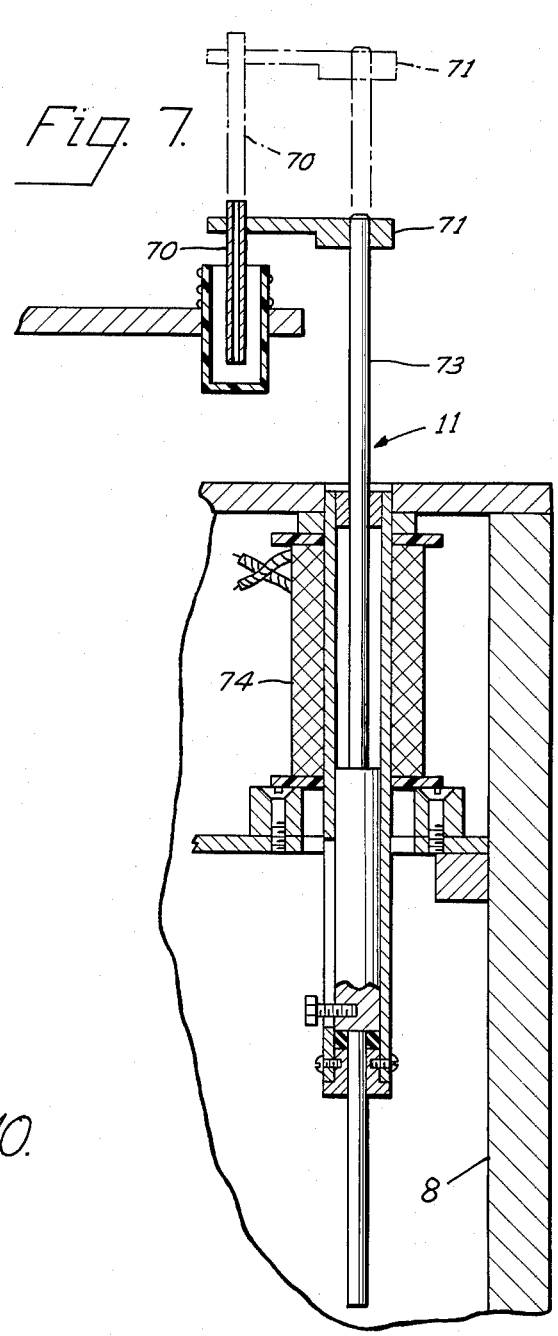

United States Patent Office 3,234,796
Patented Feb. 15, 1966

3,234,796
SAMPLE SUPPLY APPARATUS AND METHOD
Jack R. Leonards, Cleveland Heights, Ohio, assignor to Lab-Line Instruments, Inc., Chicago, Ill., a corporation of Illinois
Filed Apr. 10, 1963, Ser. No. 271,961
17 Claims. (Cl. 73—422)

This invention relates to body fluid analyzers and more particularly to new and improved charging or sampling apparatus and means for use in a system for automatically detecting the presence of a predetermined constituent in successive samples of a body fluid.

Apparatus for automatically testing successive samples of body fluids for a predetermined constituent is well known in the art and generally comprises a sample holder for holding the samples to be tested and delivering them to an intake nozzle apparatus, a pump for drawing in the samples to be tested and the reagents to be mixed therewith into and forcing them through the apparatus, mixing and conditioning means whereby the successive samples and reagents are mixed, brought to a predetermined temperature and reacted, a continuous flow colorimeter for testing the color of the treated sample against a standard and frequently, a recorder for recording the colorimeter results.

The general object of this invention is to provide new and improved apparatus for automatically testing successive samples of body fluids and the like for a predetermined constituent.

Another object of this invention is to provide new and improved apparatus for automatically testing successive samples of body fluids and the like which is simple and foolproof in operation; which charges successive samples without co-mixing therebetween, but provides improved mixing of each sample itself and the reagents therewith; which provides separate, segmented samples whereby more efficient mixing and intermixing with the reagents and conditioning and evaluation of the samples is obtained; which includes new and improved means for positively, effectively and efficiently positioning the sample carrier, for co-action with the apparatus intake means; which includes means for segmenting the successive samples to facilitate the treating, conditioning and testing thereof; which includes new and improved pump means for drawing in and forcing the samples and reagents through the apparatus; and which is of simple and efficient construction.

A still further object of this invention is to provide a new and improved apparatus for automatically testing samples of body fluids and the like for predetermined constituents obtaining one or more of the objects and advantages set forth above.

These and other objects and advantages of this invention will appear from the following description of a preferred form thereof reference being had to the accompanying drawings in which FIGURE 1 is a perspective view of body fluid testing apparatus embodying a preferred form of this invention;

FIGURE 2 is a broken sectional view taken along the line 2—2 of FIGURE 1;

FIGURE 3 is a broken sectional view taken along the line 3—3 of FIGURE 2;

FIGURE 7 is a broken sectional view taken along the line 7—7 of FIGURE 2;

FIGURE 8 is a sectional view taken along the line 8—8 of FIGURE 2;

FIGURE 9 is a sectional view taken along the line 9—9 of FIGURE 2;

FIGURE 10 is an exploded view of the intake and index control cams;

Figure 1:
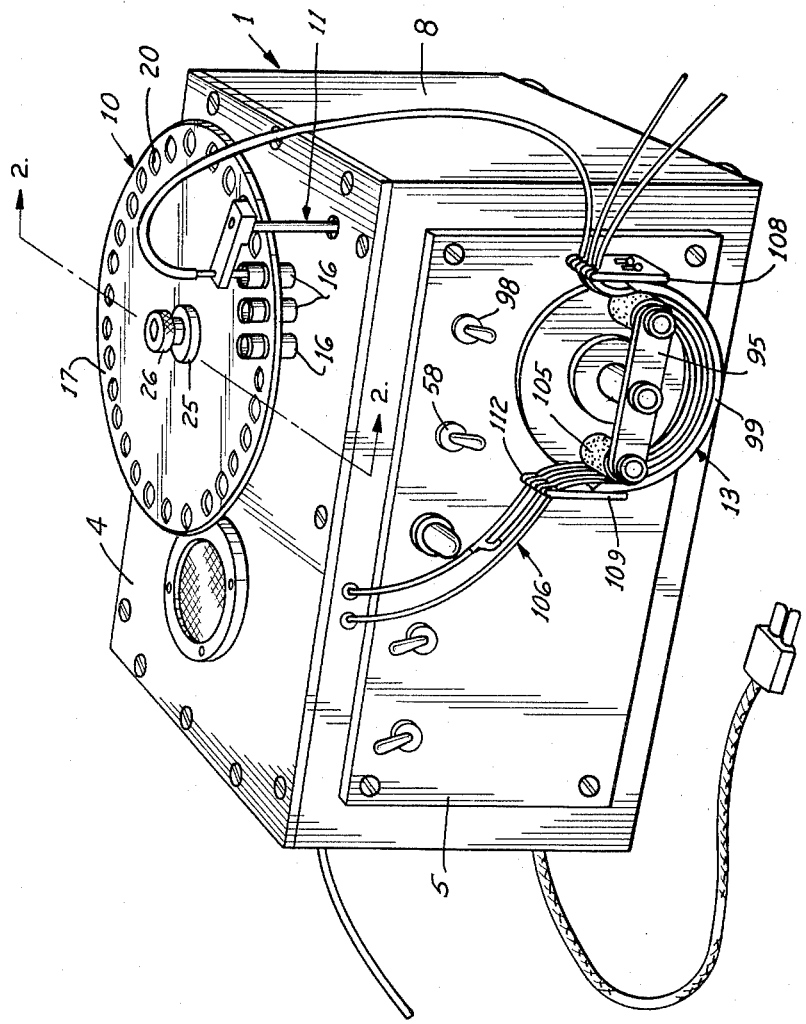

Apparatus embodying a preferred form of this invention is indicated generally at 1, FIGURE 1 and includes a housing 2 having a top wall 4, front and back walls 5 and 7, respectively, FIGURES 1 and 2, and side walls 8. Mounted on and within the housing 2 is sample carrier means 10 which is adapted to support and position the successive samples for intake into the apparatus, intake means 11, pump means 13, an incubator 14, FIGURE 12, as well as suitable conduits or tubes for conducting the fluids through the apparatus, and motors and an electrical system for operating and controlling the apparatus as will hereinafter more fully appear.

The sample carrier means 10 receives and positions successive sample vials 16 containing the fluid to be tested in accordance with principles and precepts of this invention. More particularly, the sample carrier means 10, includes a sample plate 17, which is carried on shaft 19 exteriorly of the housing top 4 so that ready access may be had thereto.

Sample plate 17 is provided at its periphery with a plurality of equiangularly spaced apertures 20, of proper size and shape to receive and support a conventional sample vial 16.

Plate 17 is adapted to rotate with shaft 19 and is conveniently mounted thereon, FIGURE 2, by being held frictionally between a bushing 22, which is secured to the shaft by set screws 23 and a washer 25 which is tightened against plate 17, to provide frictional engagement between the shaft 19 and plate 17; which is drawn up upon the threaded end 28 of shaft 19, by nut 26.

Shaft 19 is rotatably supported on the apparatus 1 and is adapted to be driven intermittently to rotate plate 17, step by step, to position successive sample vials 16 under the intake means.

To this end, a lower support shelf 29 extends between the walls 5 and 7 and an upper support shelf 31 is mounted on and in spaced relation with support 29 by means of posts 32. A bushing 34 is mounted on shaft 19 by means of set screw 35 and an index plate 37 is secured to the bushing 34 and about the shaft 19 by means of screws 38. A spacer 40 and washer 41 are also disposed about shaft 19, intermediate supports 29 and 31, to fill the space between the supports 29 and 31 so that the shaft is held upright by the reaction between the supports 29 and 31 and the members 34, 27, 40 and 41.

Index plate 37 is provided at its periphery, FIGURES 2 and 3, with a plurality of equiangularly spaced slots 44, equal in number to the number of apertures 20. A pin gear 46 is mounted on the shaft 47 of a motor 43 in operative engagement with index plate 37 to positively drive, stop and hold plate 37 and thereby plate 17. To this end, gear 46 is provided with pins 49 and 50, which are spaced apart diametrically a distance equal to the distance between adjacent slots 44, and are of such a diameter as to fit within the slots 44 to rotate the index plate as the motor 43 turns, a half turn of the pin gear advancing the index plate 37 and thereby the sample plate 17, through an angle equal to the angle between adjacent slots and apertures. Thus the apertures 20, and the vials contained therein, are advanced step by step to a predetermined position relative to the intake means 11 for co-action therewith and, as will hereinafter more fully appear, are positively stopped and held in place by the interengagement between the pins 49, 50 and the slots 44.

Figure 11:
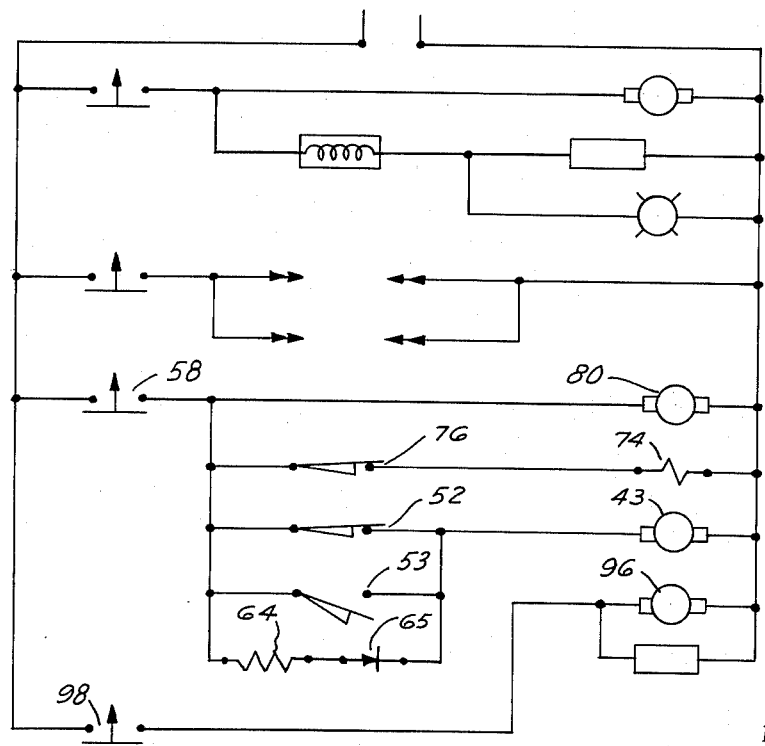
FIGURE 11 is a schematic wiring diagram of the apparatus shown in FIGURE 1.

Motor 43 is actuated and deactuated to advance index plate 37 in fixed cyclic relationship with the intake means 11, by means of electrically paralleled micro-switches 52 and 53, respectively, FIGURE 2, which are actuated by cam followers 55 and 56, respectively, and are in electrical series with motor 43, see FIGURE 11.

Switch 52 functions to close the circuit through motor 43, once the sample charging means is actuated by closing switches 58, FIGURES 1 and 11.

To this end, switch 52 is biased toward the closed position but is maintained open by the action of cam 59, FIGURES 2, 9 and 10, upon cam follower 55 and only opens when the notch or recess 61 in cam 59 is in engagement with the cam follower 55. Cam 59 is mounted on the same shaft as and in predetermined relationship with cam 62, which controls the intake means 11 as will hereinafter more fully appear.

Switch 53 is a normally opened switch which is closed and then opened as the cam follower 56 is acted upon through a cycle by one or the other of the similar cam surfaces 63 on pin gear 46, FIGURE 3. The cam surfaces 63 are 180° out of phase and thus in a half turn of the pin gear the cam follower 56 is caused to first close and then open the switch 53. Further the cams 59 and 63 are so related that switch 52 is closed first to actuate the motor 43 to turn pin gear 46 and thereby advance the index and sample plates 37 and 17, while at the same time whichever cam surface 63 is in engagement with cam follower 56, closes switch 53. Subsequently switch 52 opens but motor 43 continues to operate as the circuit remains closed through the switches 58 and 53 until pin gear 46 and thereby cam 63 is rotated through a half turn, advancing the sample plate 17 one step to position a new vial beneath the intake.

Once the half turn is completed, cam 63 opens switch 53 thereby opening the circuit through motor 43 and deactuating the same. In order to insure instantaneous stopping of motor 43 and thereby positive positioning and holding of the index and sample plates in position, a resistance 64 and rectifier 65, FIGURE 11, are also connected in series with motor 43 and in parallel with the switches 52 and 53, to place a direct current across motor 43 when the switches 52 and 53 are opened.

As suggested above, intake means 11 includes means to draw in or take up each successive sample as the same are successively disposed thereunder by carrier means 10, as well as means to segment each sample so as to preclude the need for an additional air source for proper mixing of the sample. To this end, intake means 11 includes an intake nozzle 70, FIGURES 1, 2 and 7, and means to vertically reciprocate the nozzle 70 into and out of the vial 16. Conveniently, nozzle 70 is supported on member 71, which is in turn mounted on the armature 73 of solenoid 74. Armature 73 is normally down so that nozzle 70 is within the vial 16, as shown in FIGURES 1 and 2 and in full lines in FIGURE 7 but is lifted by the action of the solenoid to raise the nozzle 70 above the top of the vial 16 when the circuit is closed through the solenoid, either so the sample plate can be advanced or the sample can be segmented and admixed with air. The circuit through the solenoid 74 is controlled by a normally open micro-switch 76, FIGURES 2 and 3, which is actuated by cam follower 77 in response to cam 62. More particularly cams 59 and 62 are mounted in fixed relative relationship on a single shaft 79, FIGURE 3, which is in turn driven at a constant speed by motor 80 whenever master switch 58 is closed, FIGURE 11.

Conveniently, to this end, cams 59 and 62 are mounted on a carrier 82, FIGURES 2 and 10, which is in turn secured to the shaft 79, and improved and more efficient vertical, horizontal and relative alignment of the cams is obtained by providing carrier 82 with an elongated central post 83, over which the cams are positioned in close tolerance, with a spacer 85 therebetween, and securing the assembly together by screws 86. Thus the cams 59 and 62 cannot rotate angularly relative to each, nor can they be misaligned axially because the post 83 insures that they are maintained concentric.

Cam 62 is provided with a recessed camming surface 88, FIGURE 8, which when in engagement with cam follower 77 permits the cam follower to close the circuit and raise the intake nozzle 70. Cam 62 also has a raised camming surface 89, which causes cam follower 77 to open the circuit through the solenoid to permit the nozzle 70 to descend into the vial disposed thereunder by carrier means 10. In addition, surface 89 is provided with a plurality of notches or recesses 91, which cause the cam follower 77 to close the circuit through the solenoid briefly and raise the intake nozzle out of the vial so that air is taken in, briefly, in lieu of the sample, thereby segmenting the sample and enhancing the mixing and reaction thereof with the reagents, while precluding the necessity of a separate air line into the apparatus. Preferably 3 such notches 91 are provided so that air is readily admixed in each sample, which is thereby segmented into fourths.

Further, cams 59 and 62 are so mounted, relative to each other, as shown in FIGURES 8, 9 and 10 that as the same are rotated by the motor 80, when switch 58 is closed, cam 62 first causes the solenoid to raise the nozzle 70, cam 59 then closes switch 52 and thereby the circuit through motor 43, to rotate the pin gear and thereby the index and sample plates whereupon cam 63 closes the index motor circuit through switch 53. Cam 59 then opens switch 52, but motor 43 continues to operate, as set forth above, as switch 53 is closed. Pin gear 46 continues to rotate until a half turn or revolution is completed, thereby advancing a new vial beneath the nozzle 70 and opening the circuit through motor 43 which is instantly stopped by the direct current flowing therethrough via resistance 64 and rectifier 65. Cam surface 88 of cam 62 then completes its engagement with cam follower 77 and surface 89 comes into engagement therewith, opening the circuit through the solenoid 74 so that nozzle 70 lowers into the new sample, which has been disposed thereunder by the means 10 as described above. As motor 80 continues to turn the new vial remains under the nozzle until a cycle or turn of the shaft 79 is completed, but meantime each time a notch 91 engages and disengages cam follower 77 the circuit through solenoid 74 is closed briefly and opened causing the nozzle to lift out of the sample, briefly, and return therein, thereby admixing air into the sample and segmenting the same.

Figure 6:
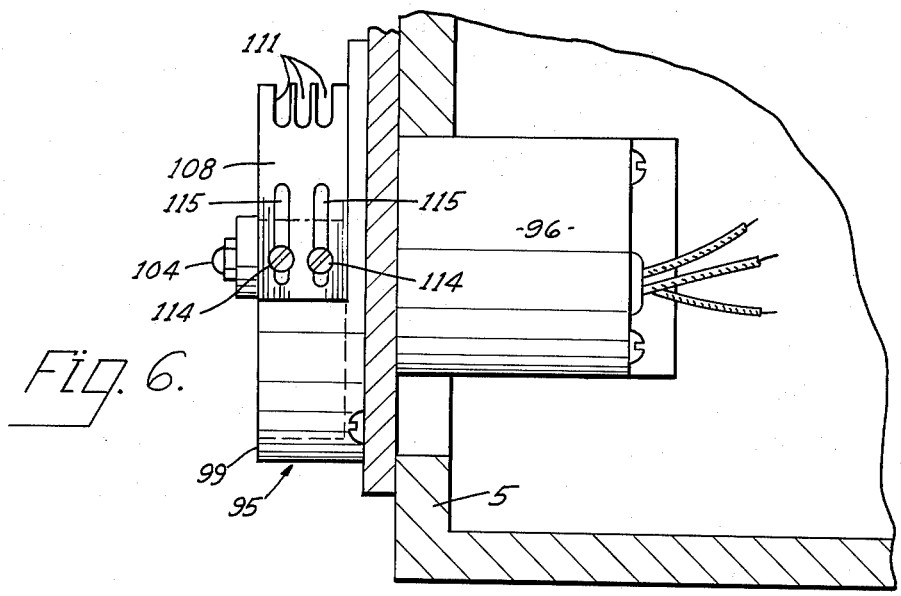
FIGURE 6 is a broken sectional view taken along the line 6—6 of FIGURE 4.

The successive samples, as well as the reagents to be reacted therewith, are drawn into and forced through the apparatus 1 by the pump means 13. Pump means 13 comprises a proportionating pump 95 driven by motor 96, FIGURE 6, at constant speed whenever switch 98, FIGURES 1 and 11, is closed.

Figure 5:
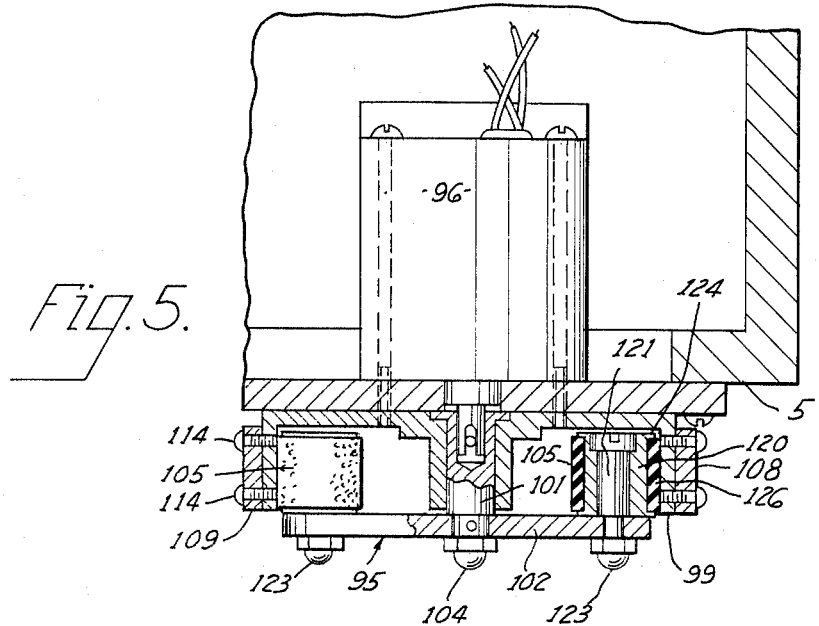
FIGURE 5 is a broken sectional view taken along the line 5—5 of FIGURE 4.
Figure 4:
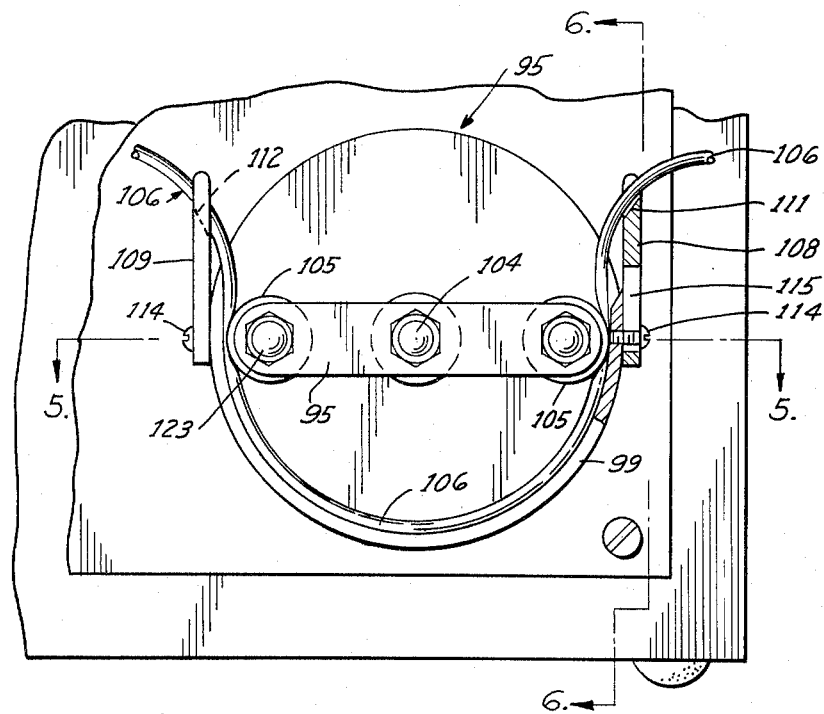
FIGURE 4 is a broken front elevational view, on an enlarged scale, of the apparatus shown in FIGURE 1, showing the pump.

Pump 95 is of the De Bakey roller type and comprises a semi-circular housing, or bearing plate 99, mounted exteriorly of housing 1 and concentrically with the pump rotor 101, which is, as noted above, driven by motor 96, FIGURES 4, 5 and 6. A transversely extending roller support arm 102 is mounted on and rotated with and by the rotor 101. Arm 102 is held on rotor 101 by any convenient means, such as nut 104, and supports a roller 105 at each end. The outer surfaces of the rollers 105 describe a cylinder having a diameter substantially equal to the inner diameter of the circular bearing plate 99.

The samples and reagents are conducted through the apparatus in suitable conduits indicated generally at 106, a portion of each of which is disposed between the pump rollers 105 and the bearing plate 99, so that the pump may act thereupon to take up and force the respective fluids through the apparatus.

In order to properly position the conduits or tubes 106 in the pump, extension plates 108 and 109 having bifurcated or slotted upper edges 111 and 112, respectively, are mounted on and extend upwardly from the top of each end of the bearing plate 99. The tubes 106 are led through the slots 111, beneath the arm 102, rotor 101 and roller 105 and out through slots 112, the length of the tubes between slots 111 and 112 being somewhat less than the circumferential distance therebetween, so that the tubes are under tension when acted upon by the rollers 105 and squeezed between the rollers and the plate 99. Further plates 108 and 109 are preferably mounted on plate 99 by screws 114 which extend through slots 115, see FIGURES 5 and 6, so that the height of slots 111 and 112 and thereby the tension on the tubes extending therebetween can be easily adjusted. Further in order to protect the tubes in the pump and provide an even constant pressure therein each roller 105 comprises a solid core 120, FIGURE 5, which is rotatably supported on arm 102 by shoulder stud 121 and nut 123. Core 120 has a U or channeled shape seat 124 in and upon which a resilient cylindrical sleeve 126 is mounted by stretching the same over the end of core 120 and permitting it to contract into position.

Figure 12:
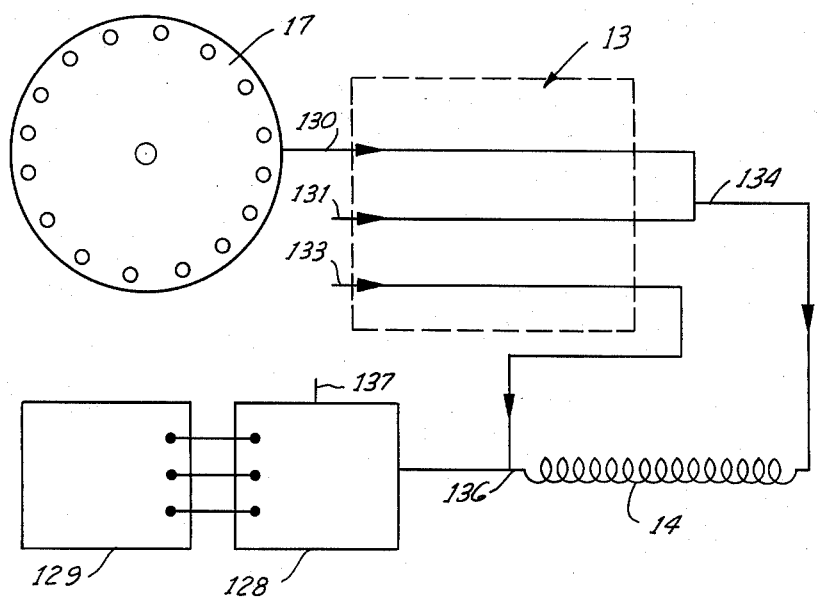
FIGURE 12 is a schematic diagram of a complete body fluid testing and recording apparatus embodying the apparatus shown in FIGURE 1 in use for the determination of protein bound iodine.

From the pump, the fluids are mixed, incubated and reacted and then conducted through a continuous flow colorimeter 128, FIGURE 12, where the samples are successively tested against a standard and the results are recorded by conventional recording apparatus, indicated generally at 129, FIGURE 12. Although the colorimeter and recorder are shown as separate instruments, they could be housed within a common cabinet with the apparatus 1. However, their functions and purposes are well known in the art and they do not per se form a part of the instant invention but are only related therewith as a part of the total apparatus with which the apparaus 1 is or can be used.

The number of separate conduits or tubes 106 needed with apparatus 1 depends in part on the fluid being tested and the constituents being tested for.

FIGURE 12 shows schematically the use of the apparatus 1 to determine the presence of protein bound iodine. In this instant three intake tubes 130, 131 and 132 are led through the pump, with tube 130 leading to the intake nozzle 70, tube 131 leading to a ceric sulphate reagent and joining tube 130 and mixing the reagent and sample, as at 134, before heating in the incubator 14. The third tube takes up brucine reagent, which is mixed with the main stream at 136, after incubation and before the fluid passes through the colorimeter. After comparing in the colorimeter the fluid is discarded through a waste connection 137.

The new and improved proportioning pump insures that the volume of each fluid is in proper proportion, all with less deleterious effect on the tubes than with pumps of this type previously used and the charging and intake means provides not only positive changing and positioning of the samples but also a segmented sample, admixed with air, whereby to obviate the need for a separate air source.

Modifications and changes to the preferred form of the invention disclosed herein may occur to those skilled in the art who come to understand the principles and precepts thereof. Accordingly, the scope of the patent to be issued hereon should not be limited to the form of the invention herein specifically depicted and described but by the advance by which the invention has promoted the art.

I claim:

1. In apparatus for analyzing body fluids including sample changing and intake means, a proportioning pump and sample treating and conditioning means, the improvement that said sample changing and intake means comprises a shaft rotatably supported on said apparatus, a sample plate mounted on said shaft and having a plurality of equiangularly spaced apertures with sample vials therein, an index plate mounted on said shaft in fixed relative relationship with said sample plate and having a plurality of equiangularly spaced slots at its periphery equal in number to the number of said apertures, a pin gear having two diametrically spaced pins thereon, said pins being spaced apart the linear distance between adjacent slots of said index plate and engaging in adjacent slots of said index plate to rotate said index plate, a half revolution of said pin gear advancing said index and sample plates through an angle equal to the angular distance between adjacent slots and apertures, a first motor for rotating said pin gear, a solenoid having an armature, a nozzle supported on said armature and over a said aperture and vial and reciprocating in and out said vial in response to the operation of said solenoid, a second motor, a shaft driven by said second motor at constant speed, first and second cams on said second motor shaft in fixed relative relationship, a first micro-switch operated by said first cam and actuating said solenoid to raise and lower said nozzle, a second micro-switch operated by said second cam to actuate said first motor, two cam surfaces 180° out of phase on said pin gear, a third micro-switch in parallel with said second micro-switch and operable by said pin gear cams to maintain said first motor actuated and to deactuate said first motor, said first cam actuating said solenoid to maintain said nozzle raised when said index motor is operating and advancing a new vial under said nozzle and to reciprocally lower and raise said nozzle into and out of the vial disposed thereunder a plurality of times between advances of said sample plate, said pump drawing fluid through said intake nozzle throughout the operation thereof by said solenoid.

2. In apparatus for analyzing body fluids including sample changing and intake means, a proportioning pump and sample treating and conditioning means, the improvement that said sample changing and intake means comprises a shaft rotatably supported on said apparatus, a sample plate mounted on said shaft and having a plurality of equiangularly spaced apertures for receiving vials therein, an index plate mounted on said shaft in fixed relative relationship with said sample plate and having a plurality of equiangularly spaced slots at its periphery equal in number to the number of said apertures, a pin gear having two diametrically spaced pins thereon, said pins being spaced apart the linear distance between adjacent slots of said index plate and engaging in adjacent slots to rotate said index plate, a half revolution of said pin gear advancing said index and sample plates through an angle equal to the angular distance between adjacent slots and apertures, a first motor for rotating said pin gear, a solenoid having an armature, a nozzle supported on said armature and over a said aperture and reciprocable in and out of a vial in said aperture in response to the operation of said solenoid, a second motor, a shaft driven by said second motor at constant speed, first and second cams on said second motor shaft in fixed relative relationship, means operated by said first cam to actuate said solenoid to raise and lower said nozzle, means operated by said second cam to actuate said first motor, and means operated by said pin gear to maintain said first motor actuated and to deactivate said first motor, said first cam actuating said solenoid to maintain said nozzle raised when said first motor is operating and advancing a new vial under said nozzle and to reciprocally lower and raise said nozzle into and out of the vial disposed thereunder a plurality of times between advances of said sample plate, said pump drawing fluid through said intake nozzle throughout the operation thereof by said solenoid.

3. In apparatus for analyzing body fluids including sample changing and intake means, a proportioning pump and sample treating and conditioning means, the improvement that said sample changing and intake means comprises a sample plate having a plurality of equiangularly spaced apertures for receiving sample vials therein, and an index plate having a plurality of equiangularly spaced slots at its periphery equal in number to the number of said apertures, said sample and index plate being mounted for rotation about a common axis in fixed relative relationship, a pin gear having two diametrically spaced pins thereon, said pins being spaced apart the linear distance between adjacent slots of said index plate and engaging in adjacent slots of said index plate to rotate said index plate and thereby said sample plate, a half revolution of said pin gear advancing said index and sample plates through an angle equal to the angular distance between adjacent slots and apertures, motor means for rotating said pin gear, a solenoid having an armature, a nozzle supported on said armature for reciprocal motion in and out of a vial in a said aperture in response to the operation of said solenoid, first and second cams mounted for rotation in fixed relative relationship, means to rotate said cams, means operable by said first cam to actuate said solenoid to raise and lower said nozzle, means operable by said second cam to actuate said motor means, and means to deactivate said motor means when said pin gear is rotated one half turn, said first cam actuating said solenoid to maintain said nozzle raised when said motor means is operating and advancing a new vial under said nozzle and to reciprocally lower and raise said nozzle into and out of the vial disposed thereunder a plurality of times between advances of said sample plate, said pump drawing fluid through said intake nozzle throughout the operation thereof by said solenoid.

4. The apparatus according to claim 3 in which said pump is a proportioning pump having a rotor, a transverse arm mounted on said rotor for rotation therewith, a semi-circular bearing plate mounted concentric with said rotor, a roller rotatably mounted at each end of said arm and extending parallel with said rotor, each said roller having a core member with a circumferentially extending channel therein, and a flexible sleeve in said channel and of greater thickness than the depth thereof, the diameter of the circle described by said rollers as said rotor turns being substantially equal to the diameter of said bearing plate, and at least one flexible tube extending between the ends of said bearing plate and being of less length than the circumferential distance therebetween.

5. The apparatus according to claim 4 in which said bearing plate has an extension plate extending from each end thereof at each end, each extension plate has at least one slot in the free end thereof, and said tube extends through and between said slots.

6. The apparatus according to claim 5 in which said extension plates are adjustably mounted on said bearing plate, whereby to adjust the circumferential distance between the slots of said extension plates.

7. In apparatus for analyzing body fluids including a proportioning pump and sample treating and conditioning means, intake means and sample changing means for disposing successive samples beneath said intake means, the improvement that said sample intake means comprises, a solenoid having an armature, a nozzle supported on said solenoid armature and reciprocating in and out said sample in response to the operation of said solenoid, a cam, means to rotate said cam, means operated by said cam to actuate said solenoid to raise and lower said nozzle, said cam actuating said solenoid to maintain said nozzle raised when said changing means is advancing a new vial under said nozzle and to reciprocally lower and raise said nozzle into and out of the vial disposed thereunder a plurality of times between advances of said changing means, said pump drawing fluid through said intake nozzle throughout the operation thereof by said solenoid.

8. In apparatus for analyzing body fluids including sample changing and intake means, a proportioning pump and sample treating and conditioning means, the improvement that said sample changing and intake means comprises a sample plate having a plurality of equiangularly spaced apertures for receiving sample vials therein, and an index plate having a plurality of equiangularly spaced slots at its periphery equal in number to the number of said apertures, said sample and index plate being mounted for rotation about a common axis in fixed relative relationship, a gear to rotate said index plate and thereby said sample plate, motor means for rotating said gear, a solenoid having an armature, a nozzle supported on said armature for reciprocal motion in and out of a vial in a said aperture in response to the operation of said solenoid; first and second cams mounted for rotation in fixed relative relationship, means to rotate said cams, means operable by said first cam to actuate said solenoid to raise and lower said nozzle, means to deactuate said motor means when said gear has rotated said index and sample plates through an angle equal to the angular distance between adjacent slots and apertures, said first cam actuating said solenoid to maintain said nozzle raised when said motor means is operating and advancing a new vial under said nozzle and to reciprocally lower and raise said nozzle into and out of the vial disposed thereunder a plurality of times between advances of said sample plate, said pump drawing fluid through said intake nozzle throughout the operation thereof by said solenoid.

9. In apparatus for analyzing body fluids including sample changing means, intake means, a proportioning pump and sample treating and conditioning means, the improvement that said pump comprises a rotor, a transverse arm mounted on said rotor for rotation therewith, a semi-circular bearing plate mounted concentric with said rotor, a roller rotatably mounted at each end of said arm and extending parallel with said rotor, each said roller having a core member with a circumferentially extending channel therein, a flexible sleeve in each said channel and of greater thickness than the depth thereof, the diameter of the circle described by said rollers as said rotor turns being substantially equal to the diameter of said bearing plate, and at least one flexible tube extending between the ends of said bearing plate and being of less length than the circumferential distance therebetween.

10. The apparatus according to claim 9 in which said bearing plate has an extension plate mounted on and extending from each end, each extension plate has at least one slot in the free end thereof, and said tube extends through and between said slots.

11. The apparatus according to claim 10 in which said extension plates are adjustably mounted on said bearing plate, whereby to adjust the circumferential distance between the slots of said extension plates.

12. In apparatus for analyzing body fluids including sample changing means, intake means, a proportioning pump and sample treating and conditioning means, the improvement that said pump comprises a rotor, arm means mounted on said rotor for rotation therewith, a semi-circular bearing plate mounted concentric with said rotor, a plurality of equiangularly spaced rollers rotatably mounted on said arm means and extending parallel with said rotor, each said roller having a core member with a circumferentially extending channel therein, a flexible sleeve in each said channel and of greater thickness than the depth thereof, the diameter of the circle described by said rollers as said rotor turns being substantially equal to the diameter of said bearing plate, and at least one flexible tube extending between the ends of said bearing plate and being of less length than the circumferential distance therebetween.

13. In apparatus for analyzing body fluids including sample changing means, intake means, a proportioning pump and sample treating and conditioning means, the improvement that said sample changing means comprises a sample plate having a plurality of equiangularly spaced apertures for receiving sample vials therein, an index plate having a plurality of equiangularly spaced slots at its periphery equal in number to the number of said apertures, said index and sample plates being mounted for rotation about a common axis in fixed relative relationship, a pin gear having two diametrically spaced pins thereon, said pins being spaced apart the linear distance between adjacent slots of said index plate and engaging in adjacent slots of said index plate to rotate said index plate when said pin gear is rotating and to hold said index plate in fixed position when said pin gear is at rest, with at least a portion of said pin always being in engagement in a said slot, a half revolution of said pin gear advancing said index and sample plates through an angle equal to the angular distance between adjacent slots and apertures, motor means to rotate said pin gear, first means to actuate said motor means and pin gear in predetermined sequence with the operation of said intake means, and second means, actuated and controlled by said pin gear, to deactuate said motor means upon completion of a half revolution of said pin gear.

14. The method of charging a body fluid analyzer having a sample carrier with a sample to be analyzed therein, an intake nozzle for drawing in the sample, and means for creating a suction in said intake nozzle, comprising the step of segmenting said sample and admixing the same with air by reciprocating said intake nozzle into and out of said sample a plurality of times, while maintaining the suction in said intake nozzle, during withdrawal of said sample from said sample carrier into said body fluid analyzer.

15. The method of cyclically charging apparatus for analyzing body fluids having a sample plate with a plurality of sample vials carried thereon, an intake nozzle, and means to maintain a suction in said intake nozzle, comprising the steps of positioning a sample vial, containing a sample to be analyzed beneath said intake nozzle, lowering said intake nozzle into said sample vial and sample, reciprocating said intake nozzle out of and into said sample, while maintaining the suction in said intake nozzle, during withdrawal of said sample into said apparatus, to draw a segmented sample into said apparatus, raising said intake nozzle out of said sample vial, and rotating said sample plate to dispose another sample vial, containing a sample therein, beneath said intake nozzle while maintaining the suction in said intake nozzle.

16. In apparatus for analyzing body fluids including sample changing means, intake means, a proportioning pump and sample treating and conditioning means, the improvement that said sample changing means comprises a sample plate having a plurality of equiangularly spaced apertures for receiving sample vials therein, an index plate having a plurality of equiangularly spaced slots at its periphery equal in number to the number of said apertures, said index and sample plates being mounted for rotation about a common axis in fixed relative relationship, a pin gear having two diametrically spaced pins thereon and two diametrically spaced camming surfaces, said pins being spaced apart the linear distance between adjacent slots of said index plate and engaging in adjacent slots of said index plate to rotate said index and sample plates through an angle equal to the angular distance between adjacent slots and apertures, an electric motor for rotating said pin gear, and means to actuate said pin gear in sequence with the operation of said intake means, said last named means comprising first and second switches connected in parallel with each other and in series with said motor and controlling said motor, said first switch being normally closed and said second switch normally open, a first cam operating in sequence with said intake means for maintaining said first switch open and for releasing said first switch to actuate said motor to rotate said pin gear and index plate, and a cam follower operating said second switch and coacting with said camming surfaces of said pin gear, respectively, to close said second switch and maintain said motor operating for a one-half turn of said pin gear and to open said second switch and deactuate said motor upon completion of said one-half turn of said pin gear.

17. The apparatus according to claim 16 in which an electrical resistance and a rectifier are connected in parallel with said switches and in series with said motor.

References Cited by the Examiner
UNITED STATES PATENTS

| | | | |
|---|---|---|---|
| 1,848,024 | 3/1932 | Owen | 103—149 |
| 2,334,148 | 11/1943 | Jones | 103—149 |
| 2,604,248 | 7/1952 | Gorham | 141—130 |
| 2,879,141 | 3/1959 | Skeggs | 23—253 |
| 3,038,340 | 6/1962 | Isreeli | 73—423 |
| 3,127,773 | 4/1964 | Blumenfeld | 73—423 |

FOREIGN PATENTS 551,455  11/1956  Italy.

LOUIS R. PRINCE, *Primary Examiner.*

JOSEPH P. STRIZAK, RICHARD QUEISSER,
*Examiners.*